UNITED STATES PATENT OFFICE.

WALTER A. JACOBS, OF MOUNT VERNON, AND WADE H. BROWN, MICHAEL HEIDELBERGER, AND LOUISE PEARCE, OF NEW YORK, N. Y., ASSIGNORS TO THE ROCKEFELLER INSTITUTE FOR MEDICAL RESEARCH, OF NEW YORK, N. Y., A CORPORATION OF NEW YORK.

ARSENICAL COMPOUND.

1,280,127.  Specification of Letters Patent.  Patented Sept. 24, 1918.

No Drawing.   Application filed January 28, 1918.  Serial No. 214,123.

*To all whom it may concern:*

Be it known that we, WALTER A. JACOBS, Ph. D., residing at Mount Vernon, Westchester county, New York, WADE H. BROWN, M. D., residing at Flushing, in the city of New York, borough of Queens, Queens county, New York, MICHAEL HEIDELBERGER, Ph. D., residing in the city of New York, borough of Manhattan, county and State of New York, and LOUISE PEARCE, M. D., residing in the city of New York, borough of Manhattan, county and State of New York, all citizens of the United States, have jointly invented a new and Improved Arsenical Compound, of which the following is a specification.

In our co-pending applications, Serial Nos. 194,461 and 194,462, we have described two classes of arsenical compounds of use in the treatment of trypanosomal or spirochætal infections. The first class was characterized as an aromatic arsonic acid possessing an α-aminoacylarylamin side chain, the aromatic nucleus containing the arsenic being joined to the α-amino group in the side chain; the second class included substances characterized as an aromatic arsinoxid possessing an α-aminoacylarylamin side chain, the aromatic nucleus containing the arsenic being joined to the α-amino group in the side chain.

In pursuing further our chemical and biological experiments we have, by passing to the arseno compounds of these substances, obtained substances with still greater therapeutic effects. This new class of compounds may be chemically described as arsenophenylglycin-bis-arylamids, or, more generally, as N-(arsenoaryl)-bis-α-aminoacylarylamins having the following type formula:

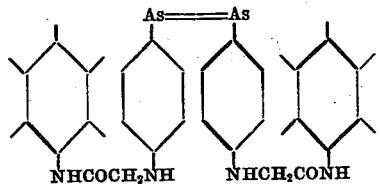

To obtain substances of this type which are soluble in aqueous alkaline solutions it is necessary to substitute in any position in the arylamin nuclei one or more hydroxyl (OH), sulfonamid ($SO_2NH_2$), carboxy (COOH), sulfonic acid ($SO_3H$), or other salt forming groups either alone or in combination with other groups. In the same way these substances may be chemically varied by like substitutions in the aryl nuclei containing the arseno (As=As) residue or by altering the position of the arseno group with reference to the α-aminoacylarylamin side chains.

In addition, the chain .$NHCH_2CONH$. which joins each nucleus containing the arsenic with the two additional nuclei may be extended to include .NHCHRCONH., in which R may be alkyl or aryl as explained in our co-pending applications, Serial Nos. 194,461 and 194,462. These substances are not identical or analogous in a chemical or biological way to arsenophenylglycin, nor are they derived therefrom. They represent an entirely new type of organic arseno compound.

These substances have been prepared by the action of strong reducing agents upon the corresponding arsonic acid or the arsinoxid derived from it. In particular that substance which is produced by the reduction of N-(phenyl-p-arsonic acid)-glycyl-m'-aminophenol or the arsinoxid derived from it, both of which have been described in our co-pending applications, Serial Nos. 194,461 and 194,462, and which may be chemically designated as p-arsenophenylglycin-bis-m'-oxyanilid with the following formula:

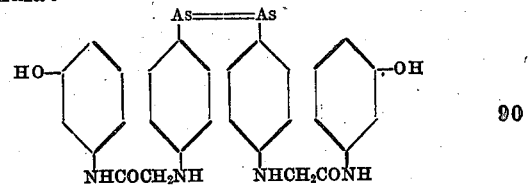

has proven to be a most powerful agent for curing trypanosomal and spirochætal infections, particularly syphilis.

This and similar basic substances are described and claimed in our co-pending application, Serial No. 194,463, of which this application is a continuation in part. We have also found that the salts of these compounds, formed by combination with an acid, are likewise effective; for example, the hydrochlorid and the sulfate.

The hydrochlorid may be prepared by the following preferred methods:

Example I.

60 grams of sodium hypophosfite are dissolved in 25 cc. of warm water and treated with 100 cc. concentrated hydrochloric acid, then, with chilling, 400 cc. methyl alcohol added. The sodium chlorid is filtered off and the solution of hypophosphorous acid so obtained is treated with 5 cc. of 43 per cent. hydriodic acid. This is then added to a solution prepared by pouring upon 75 grams of N-(phenyl-p-arsonic acid)-glycyl-m'-aminophenol 1 liter of a mixture of 4 volumes of methyl alcohol and 1 volume concentrated hydrochloric acid and warming to 35–40° C. The reaction occurs at once with the separation of the dihydrochlorid of the arseno compound as a light yellow powder. After 15 minutes this is filtered off and washed carefully with a mixture of 4 volume parts of methyl alcohol and 1 of concentrated hydrochloric acid. The hydrochlorid so obtained is dried in vacuum exsiccators. The product so obtained is then powdered and preserved in sealed tubes, from which air has been exhausted or containing an inert, non-oxidizing gas, such as nitrogen, carbon dioxid or hydrogen. The yield is almost quantitative.

Example II.

10 grams of N-(phenyl-p-arsinoxid)-glycyl-m'-aminophenol are dissolved in 50 cc. of a mixture of 4 parts methyl alcohol and 1 part concentrated hydrochloric acid and treated with a solution of hypophosphorous acid obtained from 4 grams sodium hypophosfite as given in Example I. The hydrochlorid of the arseno compound separates at once and is washed and preserved as in Example I.

If a salt other than a hydrochlorid is desired, the appropriate acid is used in place of hydrochloric acid, in a procedure similar to that described in the above examples. For example, if a sulfate is desired, sulfuric acid is employed instead of hydrochloric acid.

In the above examples, instead of using sodium hypophosfite, the solution can be made directly from hypophosphorous acid itself. Other strong reducing agents may also be employed.

The foregoing are a few examples of substances falling within the spirit and scope of our invention. It will be obvious to anyone skilled in the art that many variations in the exact constitution of the substances described may be made without departing from the spirit and scope of our invention.

What we claim is:

1. As a new product, the salt formed by the combination of an acid with an N-(arsenoaryl)-bis-α-amino-acylarylamin in which the arylamin nucleus carries an attached salt forming substituent, substantially as described.

2. As a new product, the salt formed by the combination of an acid with an N-(arsenoaryl)-bis-glycylarylamin in which the arylamin nucleus carries an attached salt forming substituent substantially as described.

3. As a new product, the salt formed by the combination of an acid with an N-(arsenoaryl)-bis-glycyloxyarylamin.

4. As a new product, the salt formed by the combination of an acid with an N-(arsenophenyl)-bis-glycyl-m'-aminophenol.

5. As a new product, the salt formed by the combination of an acid with N-(p-arseno-phenyl)-bis-glycyl-m'-aminophenol, otherwise more shortly expressed as p-arsenophenylglycin-bis-m'-oxyanilid, having the formula:

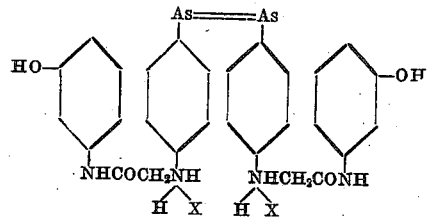

(wherein X represents any acid radical).

6. As a new product, the salt formed by the combination of an acid with an N-(arsenoaryl)-bis-α-aminoacylarylamin in which the aryl nuclei carry an attached salt forming substituent, substantially as described.

7. As a new product, the hydrochlorid formed by the combination of hydrochloric acid with an N-(arsenoaryl)-bis-α-aminoacylarylamin in which the arylamin nucleus carries an attached salt forming substituent, substantially as described.

8. As a new product, the hydrochlorid formed by the combination of hydrochloric acid with an N-(arsenoaryl)-bis-glycylarylamin in which the arylamin nucleus carries an attached salt forming substituent, substantially as described.

9. As a new product, the hydrochlorid formed by the combination of hydrochloric acid with an N-(arsenoaryl)-bis-glycyloxyarylamin.

10. As a new product, the hydrochlorid formed by the combination of hydrochloric acid with an N-(arsenophenyl)-bis-glycyl-m'-amino-phenol.

11. As a new product, the hydrochlorid formed by the combination of hydrochloric acid with N-(p-arsenophenyl)-bis-glycyl-m'-aminophenol, otherwise more shortly expressed as p-arsenophenylglycine-bis-m'-oxyanilid, having the formula:

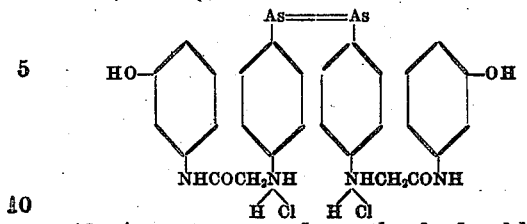

12. As a new product, the hydrochlorid formed by the combination of hydrochloric acid with an N-(arsenoaryl)-bis-α-aminoacylarylamin in which the aryl nuclei carry an attached salt forming substituent, substantially as described.

WALTER A. JACOBS, Ph. D.
WADE H. BROWN, M. D.
MICHAEL HEIDELBERGER, Ph. D.
LOUISE PEARCE, M. D.